(12) United States Patent
Kruempelmann et al.

(10) Patent No.: US 12,008,490 B2
(45) Date of Patent: Jun. 11, 2024

(54) CENTRALIZED CONFIGURATION OF ENTERPRISE SOFTWARE APPLICATIONS

(71) Applicant: SAP SE, Walldorf (DE)

(72) Inventors: Wulf Kruempelmann, Altlussheim (DE); Barbara Freund, Heidelberg (DE)

(73) Assignee: SAP SE, Walldorf (DE)

( * ) Notice: Subject to any disclaimer, the term of this patent is extended or adjusted under 35 U.S.C. 154(b) by 642 days.

(21) Appl. No.: 16/690,076

(22) Filed: Nov. 20, 2019

(65) Prior Publication Data

US 2021/0150433 A1   May 20, 2021

(51) Int. Cl.
*G06Q 10/0631*   (2023.01)
*G06Q 10/0639*   (2023.01)
*G06Q 10/1091*   (2023.01)

(52) U.S. Cl.
CPC .. *G06Q 10/06311* (2013.01); *G06Q 10/06398* (2013.01); *G06Q 10/1091* (2013.01)

(58) Field of Classification Search
CPC ........ G06Q 10/00; G06Q 10/02; G06Q 10/06; G06Q 10/10; G06Q 10/06311; G06Q 10/06398; G06Q 10/1091; G06F 8/60; G06F 8/76; G06F 16/228227; G06F 16/2282; G06F 16/27; H04L 67/34
See application file for complete search history.

(56) References Cited

U.S. PATENT DOCUMENTS

| | | | | |
|---|---|---|---|---|
| 2007/0061428 A1* | 3/2007 | Haley | ............... | G06F 16/972 707/E17.117 |
| 2013/0268920 A1* | 10/2013 | Ursal | ............... | G06F 8/70 717/131 |
| 2015/0370608 A1* | 12/2015 | Dipol | ............... | H04L 67/1025 718/104 |
| 2016/0170743 A1* | 6/2016 | Shmulevich | ............... | G06F 8/30 717/120 |
| 2016/0217423 A1* | 7/2016 | Magnan | ............... | G06Q 10/103 |

(Continued)

OTHER PUBLICATIONS

Zhu et al., Software Customization Based on Model-Driven Architecture Over SaaS Platforms, Jan. 1, 2009, 2009 International Conference on Management and Service Science, IEEE, pp. 1-4 (Year: 2009).*

*Primary Examiner* — Robert D Rines
(74) *Attorney, Agent, or Firm* — Mintz Levin Cohn Ferris Glovsky and Popeo, P.C.

(57) ABSTRACT

A method may include a configuration engine receiving inputs for generating a customized function whose performance requires a first software application at a first host system to perform a first subprocess and a second software application at a second host system to perform a second subprocess. The configuration engine may apply a first customization to a first template to change a first manner in which data is stored in a first database table operated upon by the first software application while performing the first subprocess. A second customization may be applied to a second template to change the second manner in which data is stored in a second database table operated upon by the second software application while performing the second subprocess. The customized function may be implemented by sending the first template to the first host system and the second template to the second host system.

16 Claims, 5 Drawing Sheets

(56) References Cited

U.S. PATENT DOCUMENTS

| | | | |
|---|---|---|---|
| 2017/0076295 A1* | 3/2017 | Vasudev | G06Q 30/016 |
| 2018/0247064 A1* | 8/2018 | Aronovich | G06F 16/24552 |
| 2018/0336027 A1* | 11/2018 | Narayanan | H04L 41/082 |
| 2020/0110591 A1* | 4/2020 | Buczkowski | G06F 8/62 |

* cited by examiner

| DATE_TYPE | PAYPLAN_TYPE | P_DESCR |
|---|---|---|
| ... | ... | ... |
| ... | ... | ... |
| ... | ... | ... |

CENTRALIZED CONFIGURATION OF ENTERPRISE SOFTWARE APPLICATIONS

TECHNICAL FIELD

The present disclosure generally relates to cloud-computing and, more specifically, to centralizing the configuration of enterprise software applications.

BACKGROUND

The operations of many organizations may rely on a suite enterprise software applications including, for example, enterprise resource planning (ERP) software, customer relationship management (CRM) software, and/or the like. These enterprise software applications may provide a variety of functionalities including, for example, billing, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

SUMMARY

Methods, systems, and articles of manufacture, including computer program products, are provided for centralized configuration of enterprise software applications. In one aspect, there is provided a system including at least one processor and at least one memory. The at least one memory can store instructions that cause operations when executed by the at least one processor. The operations may include: receiving, at a configuration engine, one or more inputs for generating a customized function whose performance requires a first software application to perform a first subprocess and a second software application to perform a second subprocess, the first software application deployed at a first host system, and the second software application deployed at a second host system; applying, based at least on the one or more inputs, a first customization to a first template associated with the first software application and a second customization to a second template associated with the second software application, the first template defining a first manner in which data is stored in a first database table operated upon by the first software application performing the first subprocess, and the second template defining a second manner in which data is stored in a second database table operated by the second software application performing the second subprocess; and implementing the customized function by at least sending, to the first host system, the first template having the first customization and sending, to the second host system, the second template having the second customization.

In some variations, one or more of the features disclosed herein including the following features can optionally be included in any feasible combination. The customized function may be staged at the configuration engine prior to sending the first template to the first host system and the second template to the second host system. The customized function may be staged to at least determine whether the first customization applied to first software application is compatible with the second customization applied to the second software application. The customized function may be further staged to at least determine whether the first customization and the second customization are consistent with the customized function.

In some variations, a first artifact including the first template may be imported from the first host system. The first artifact may further include documentation and/or metadata. The documentation and/or the metadata may identify one or more static features and/or runtime features of the first software application.

In some variations, a second artifact including the second template may be imported from the second host system. The second artifact may further include documentation and/or metadata. The documentation and/or the metadata may identify one or more static features and/or runtime features of the second software application.

In some variations, the configuration engine may generate a user interface for presentation at a client device. The user interface may be configured to display a plurality of queries. The user interface may be further configured to receive, from a user at the client device, the one or more inputs in response to the plurality of queries.

In some variations, the first customization may change the first manner in which data is stored in the first database table operated upon by the first software application. The second customization may change the second manner in which data is stored in the second database table operated upon by the second software application.

In some variations, the first template may specify at least a first column included in the first database table operated upon by the first software application. The second template may specify at least a second column included in the second database table operated upon by the second software application.

In some variations, the software application may be an enterprise resource planning (ERP) software application, a customer relationship management (CRM) software application, and/or a supply chain management (SCM) software application.

In some variations, the one or more functions may include invoicing, procurement, payroll, time and attendance management, recruiting and onboarding, learning and development, performance and compensation, and/or workforce planning.

In another aspect, there is provided a method for centralized configuration of enterprise software applications. The method may include: receiving, at a configuration engine, one or more inputs for generating a customized function whose performance requires a first software application to perform a first subprocess and a second software application to perform a second subprocess, the first software application deployed at a first host system, and the second software application deployed at a second host system; applying, based at least on the one or more inputs, a first customization to a first template associated with the first software application and a second customization to a second template associated with the second software application, the first template defining a first manner in which data is stored in a first database table operated upon by the first software application performing the first subprocess, and the second template defining a second manner in which data is stored in a second database table operated by the second software application performing the second subprocess; and implementing the customized function by at least sending, to the first host system, the first template having the first customization and sending, to the second host system, the second template having the second customization.

In some variations, one or more of the features disclosed herein including the following features can optionally be included in any feasible combination. The method may further include staging, at the configuration engine, the customized function prior to sending the first template to the first host system and the second template to the second host system. The customized function may be staged to at least determine whether the first customization applied to first software application is compatible with the second customization applied to the second software application. The customized function may be further staged to at least determine whether the first customization and the second customization are consistent with the customized function.

In some variations, the method may further include importing, from the first host system, a first artifact including the first template. The first artifact may further include documentation and/or metadata. The documentation and/or the metadata may identify one or more static features and/or runtime features of the first software application.

In some variations, the method may further include importing, from the second host system, a second artifact including the second template. The second artifact may further include documentation and/or metadata. The documentation and/or the metadata may identify one or more static features and/or runtime features of the second software application.

In some variations, the method may further include generating, by the configuration engine, a user interface for presentation at a client device. The user interface may be configured to display a plurality of queries. The user interface may be further configured to receive, from a user at the client device, the one or more inputs in response to the plurality of queries.

In some variations, the first customization may change the first manner in which data is stored in the first database table operated upon by the first software application. The second customization may change the second manner in which data is stored in the second database table operated upon by the second software application.

In some variations, the first template may specify at least a first column included in the first database table operated upon by the first software application. The second template may specify at least a second column included in the second database table operated upon by the second software application.

In some variations, the software application may be an enterprise resource planning (ERP) software application, a customer relationship management (CRM) software application, and/or a supply chain management (SCM) software application.

In another aspect, there is provided a computer program product that includes a non-transitory computer readable medium. The non-transitory computer readable medium may store instructions that cause operations when executed by at least one data processor. The operations may include: receiving, at a configuration engine, one or more inputs for generating a customized function whose performance requires a first software application to perform a first subprocess and a second software application to perform a second subprocess, the first software application deployed at a first host system, and the second software application deployed at a second host system; applying, based at least on the one or more inputs, a first customization to a first template associated with the first software application and a second customization to a second template associated with the second software application, the first template defining a first manner in which data is stored in a first database table operated upon by the first software application performing the first subprocess, and the second template defining a second manner in which data is stored in a second database table operated by the second software application performing the second subprocess; and implementing the customized function by at least sending, to the first host system, the first template having the first customization and sending, to the second host system, the second template having the second customization.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to centralizing the configuration of enterprise software applications, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
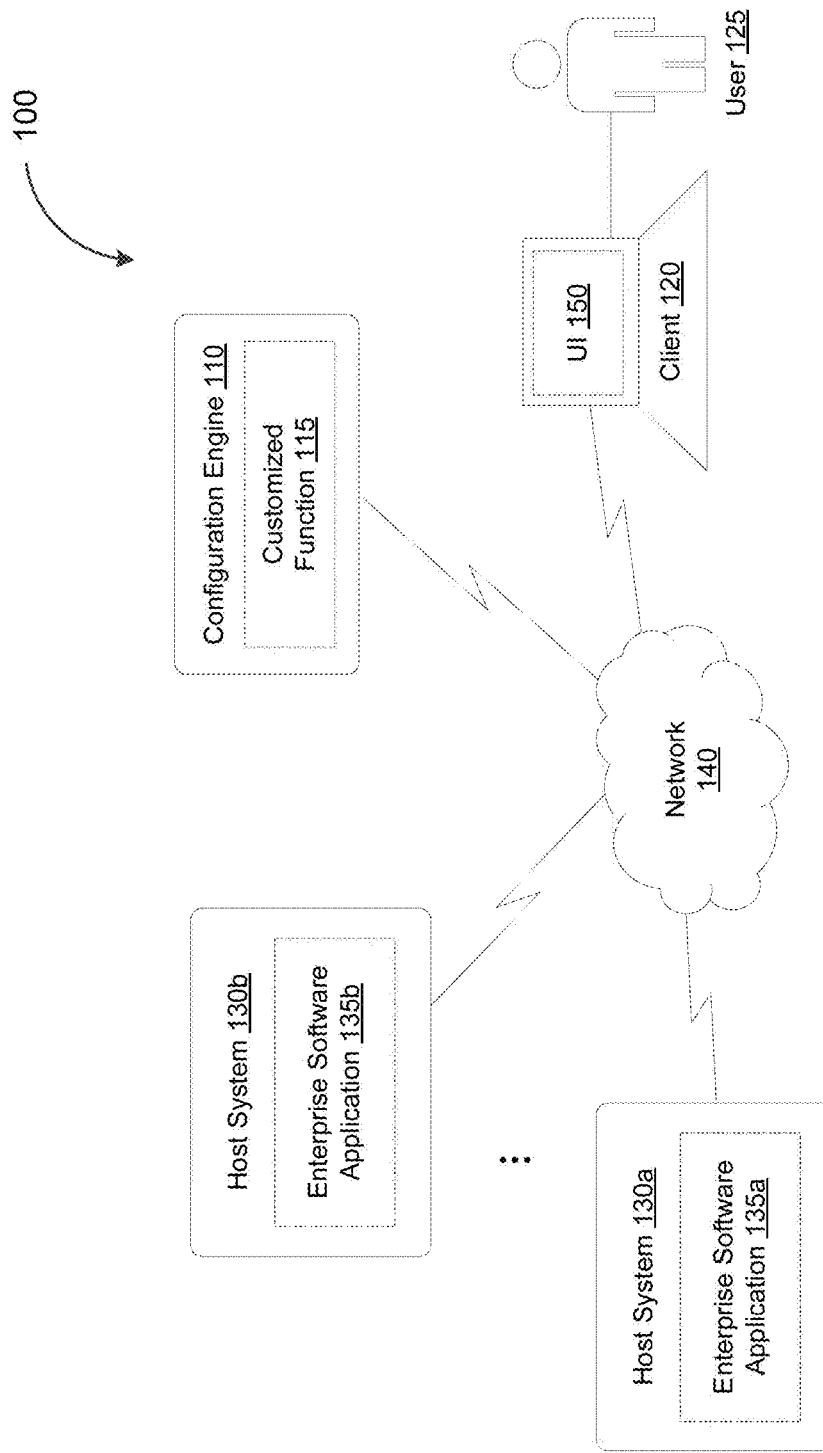
FIG. 1 depicts a system diagram illustrating a configuration system, in accordance with some example embodiments.

When practical, like labels are used to refer to same or similar items in the drawings.

DETAILED DESCRIPTION

An enterprise software application may operate on data stored in one or more database tables. As such, the enterprise software application may be implemented based on a template defining the manner in which data is stored in the database tables. For example, the template may specify the columns that form the entries occupying the rows in each one of the database tables. The enterprise software application may be delivered to different end users with a template library including a set of templates. Each end user may subsequently select, based on individual requirements, one or more of the templates from the template library. For instance, one end user may select, as part of the scoping the enterprise software application, a template specific to the end user's industry and/or application. That end user may further customize the enterprise software application by applying, to the selected template, one or more end user specific customizations prior to deploying the customized enterprise software application to that end user's production system. For instance, the customized enterprise software application may be deployed to a cloud-computing platform such that the functionalities of the customized enterprise software application are remotely accessible from one or more thin clients (e.g., a web browser and/or the like).

A single end user may often be associated with a suite of enterprise software applications including, for example, an enterprise resource planning (ERP) software application, a customer relationship management (CRM) software application, and/or the like. For example, multiple enterprise software applications may be required to operate on the same data in order to accomplish a single function such as billing, invoicing, procurement, payroll, time and attendance management, recruiting and onboarding, learning and development, performance and compensation, workforce planning, and/or the like. To implement a single function having one or more end user specific customizations may therefore require the end user to scope multiple enterprise software applications. However, these enterprise software applications may be deployed at different host systems (e.g., cloud-based systems and/or the like) such that the end user is typically required to scope each enterprise software application separately, for example, by customizing the corresponding templates. Moreover, the end user may be required to maintain consistency and compatibility across different enterprise software applications while scoping each enterprise software application. As such, implementing a customized function may be especially challenging when the enterprise software applications required to achieve the customized function reside at different host systems.

In some example embodiments, a configuration engine may be configured to facilitate the implementation of customized functions by at least centralizing the configuration of various enterprise software applications, including enterprise software applications distributed across different host systems. Instead of customizing each enterprise software application separately to achieve a customized function, the end user may interact with the configuration engine to implement the customized function. The configuration engine may apply, to each enterprise software application, the customizations required to achieve the customized function. For example, the configuration engine may customize an enterprise software application by at least invoking an application programming interface (API) of the enterprise software application. The configuration engine may apply customizations that change a template defining the manner in which data is stored in one or more database tables operated upon by the enterprise software application such that the enterprise software application is able to perform the customized function.

FIG. 1 depicts a system diagram illustrating a configuration system 100, in accordance with some example embodiments. Referring to FIG. 1, the configuration system 100 may include a configuration engine 110 and a client 120. The configuration system 100 may further include a plurality of host systems including, for example, a first host system 130a, a second host system 130b, and/or the like. As shown in FIG. 1, the configuration engine 110, the the client 120, the first host system 130a, and the second host system 130b may be communicatively coupled via a network 140. The network 140 may be a wired and/or wireless network including, for example, a wide area network (WAN), local area network (LAN), a virtual local area network (VLAN), the Internet, and/or the like. Meanwhile, the first host system 130a and/or the second host system 130b may be cloud-based systems hosted on one or more cloud-computing platforms.

In some example embodiments, the configuration engine 110 may be centralize the configuration of multiple enterprise software applications, including enterprise software applications distributed across different host systems. For example, as shown in FIG. 1, a user 125 at the client 120 may interact with the configuration engine 110 in order to customize a first enterprise software application 135a deployed at the first host system 130a as well as a second enterprise software application 135b deployed at the second host system 130b. The first enterprise software application 135a and/or the second enterprise software application 135b may be an enterprise resource planning (ERP) software application, a customer relationship management (CRM) software application, and/or the like. The user 125 may customize the first enterprise software application 135a and the second enterprise software application 135b in order to implement a customized function 115 requiring the first enterprise software application 135a as well as the second enterprise software application 135b.

Examples of the customized function 115 may include billing, invoicing, procurement, payroll, time and attendance management, recruiting and onboarding, learning and development, performance and compensation, and workforce planning. In order to accomplish the customized function 115, the first enterprise software application 135a and the second enterprise software application 135b may operate on the same data. Accordingly, the first enterprise software application 135a and the second enterprise software application 135b may each be implemented based on a template. The template may define the manner in which data is stored in one or more database tables operated upon by the first enterprise software application 135a and the second enterprise software application 135b while performing the customized function 115. For instance, the template may specify the columns that form the entries occupying the rows in each one of the database tables operated upon by the first enterprise software application 135a and the second enterprise software application 135b while performing the customized function 115.

Table 1 below depicts pseudo programming code for a template defining the manner in which data is stored in a database table. In the example shown in Table 1, the template may include extensible markup language (XML) defining the manner in which data is stored in a database table.

TABLE 1

```
<item>
  <object_name> manufacturing method </object_name>
  <object_type> table_content</object_type>
  <table_name>tab_manufacuring</table_name>
  <field> method</field>
  <content>batch</content>
  <field>product</field>
  <content>medicine</content>
</item>
```

In some example embodiments, the first enterprise software application 135a may operate on data in a first database table. The first enterprise software application 135a may therefore be implemented based on a template defining the manner in which data is stored in that first database table. For instance, the first enterprise software application 135a may be implemented based on a template specifying the columns that form the entries occupying the rows in the first database table. Alternatively and/or additionally, the second enterprise software application 135b may operate on data in a second database table and a third database table. As such, the second enterprise software application 135b may be implemented based on a template defining the manner in which data is stored in the second database table and the third database table including by specifying, for example, the columns that form the entries occupying the rows in the second database table and the third database table.

Figure 2A:
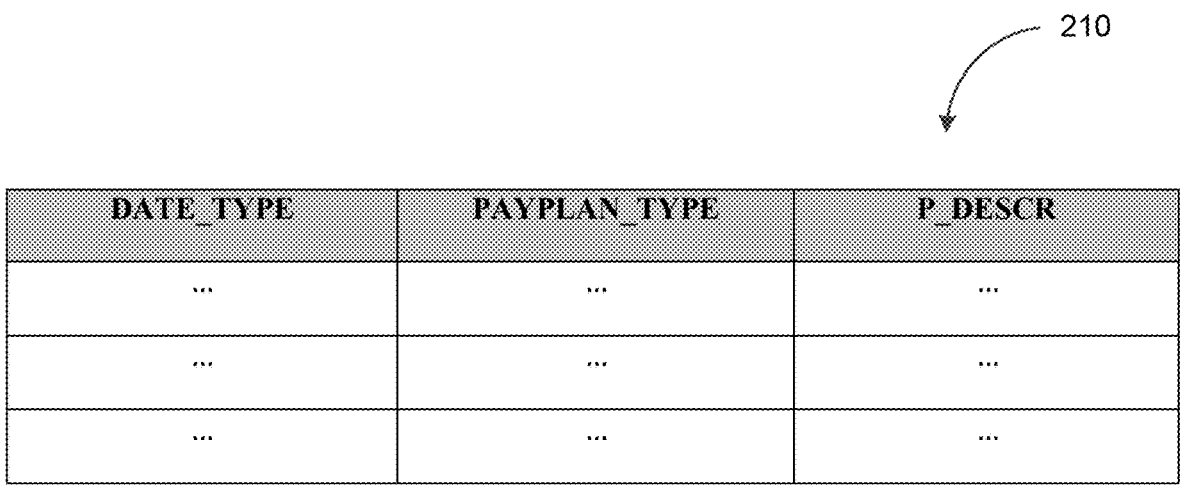
FIG. 2A depicts an example of a database table operated upon by an enterprise software application, in accordance with some example embodiments.

To further illustrate, FIG. 2A depicts an example of a first database table 210, which may contain data operated upon by the first enterprise software application 135a. Meanwhile, FIG. 2B depicts an example of a second database table 220 and a third database table 230, each of containing data operated upon by the second enterprise software application 135b.

In some example embodiments, the customized function 115 may be an invoicing function that requires an enterprise resource planning (ERP) software application as well as a customer relationship management (CRM) software application. Accordingly, the first enterprise software application 135a may be the enterprise resource planning (ERP) software application while the second enterprise software application 135b may be the customer relationship management (CRM) software application. Moreover, the first database table 210 may store the billing plan data that is associated with the enterprise resource planning (ERP) software application whereas the second database table 220 and the third database table 230 may store billing plan data that is associated with the customer relationship management (CRM) software application.

Figure 2B:
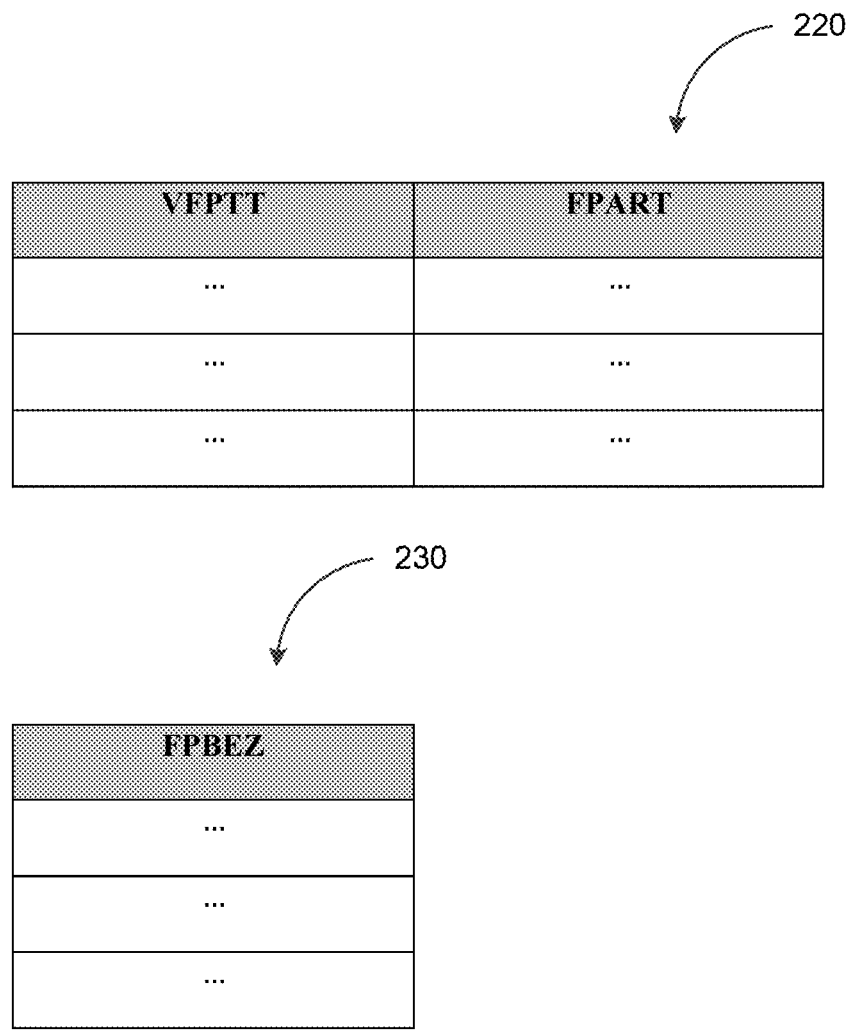
FIG. 2B depicts an example of database tables operated upon by an enterprise software application, in accordance with some example embodiments.

As FIGS. 2A-B show, the first host system 130a may store billing data in a different manner than the second host system 130b. Accordingly, the first enterprise software application 135a and the second enterprise software application 135b may be implemented based on different templates reflecting the different manners in which data is stored at the first host system 130a (e.g., in the first database table 210) and at the second host system 130b (e.g., in the second database table 220 and the third database table 230). When customizing the first enterprise software application 135a and the second enterprise software application 135b to implement the customized function 115, the customization engine 110 may ensure that the customizations applied to the corresponding templates are compatible with one another and consistent with the customized function 115.

As shown in FIGS. 2A-B, the first database table 210, the second database table 220, and the third database table 230 may include different columns. For instance, the first database table 210 may include the columns DATE_TYPE, PAYPLAN_TYPE, and P_DESCR. Meanwhile, the second database table 220 may include the columns VFPTT and FPART while the third database table 230 may include the column FPBEZ. Although the columns in the first database table 210 have different names than the columns in the second database table 220 and the third database table 230, the columns in the first database table 210 may be mapped to corresponding columns in the second database table 220 and the third database table 230.

For example, the column DATE_TYPE from the first database table 210 may be mapped to the column VFPTT in the second database table 220 and the column PAYPLAN_TYPE from the first database table 210 may be mapped to the column FPART in the second database table 220. Furthermore, the column P_DESCR may be mapped to the column FPBEZ in the third database table 230. Accordingly, the configuration engine 110 may apply, to a template associated with the first database table 210, customizations that are compatible with the template with the second database table 220 and the customized function 115.

In some example embodiments, in order to implement the customized function 115, the user 125 may interact with the configuration engine 110 via a user interface 150 presented at the client 120. The user interface 150 may be configured to receive, from the user 125, one or more inputs scoping the customized function 115. For example, the user interface 150 may be configured to receive, from the user 125 at the client 120, a first input selecting a function. Moreover, the user interface 150 may be configured to receive, from the user 125 at the client 120, a second input specifying one or more customizations that are applied to the selected function to generate the customized function 115. It should be appreciated that the configuration engine 110 may be configured to generate a series of queries for scoping the customized function 115. As such, the first input and/or the second input may be responses to the queries generated by the configuration engine 110 and displayed at the user interface 150.

As noted, multiple enterprise software applications, including the first enterprise software application 135a and the second enterprise software application 135b, may be required to perform the customized function 115. That is, the first enterprise software application 135a may perform a first subprocess associated with the customized function 115 and the second enterprise software application 135b may perform a second subprocess associated with the customized function 115. Accordingly, in order to perform the customized function 115, the first enterprise software application 135a and the second enterprise software application 135b may be customized such that the first subprocess and the second subprocess are compatible with one another as well as consistent with the customized function 115.

In some example embodiments, the configuration engine 110 may be configured to identify a variety of enterprise software applications available to the user 125 at the client 120 including, for example, the first enterprise software application 135a at the first host system 130a and the second enterprise software application 135b at the second host system 135b. Moreover, the configuration engine 110 may be configured to import, from each of the first host system 135a and the second host system 135b, one or more artifacts associated with each of the first enterprise software application 135a and the second enterprise software application 135b. It should be appreciated that these artifacts may include documentation as well as metadata identifying one or more static features and/or runtime features of each of the first enterprise software application 135a and the second enterprise software application 135b. These artifacts may form the templates associated with each of the first enterprise software application 135a and the second enterprise software application 135b.

A template may define, as noted, the manner in which data is stored in one or more database tables operated upon by an enterprise software application while performing a function. Accordingly, customizing the first enterprise software application 135a and the second enterprise software application 135b to perform the customized function 115 may include customizing one or more corresponding templates associated with the first enterprise software application 135a and the second enterprise software application 135b. In some example embodiments, the configuration engine 110 may therefore customize each of the first enterprise software application 135a and the second enterprise software application 135b by at least applying, to the corresponding templates, one or more customizations such that the first subprocess performed by the first enterprise software application 135a and the second subprocess performed by the second enterprise software application 135b are compatible with one another as well as consistent with the customized function 115.

The customization of the first enterprise software application 135a and the second enterprise software application 135b may further include the configuration engine 110 sending, to each of the first host system 135a and the second host system 135b, artifacts corresponding to the customized templates associated with each of the first enterprise software application 135a and the second enterprise software application 135b. Once the customizations are propagated to the first host system 135a and the second host system 135b, the user 125 at the client 120 may invoke the customized function 115. It should be appreciated that the configuration engine 110 may interact with each of the first enterprise software application 135a and the second enterprise software application 135b, including to retrieve and/or deliver the corresponding artifacts, by invoking a respective application programming interface (API).

The artifacts sent to each of the first host system 135a and the second host system 135b may be subject to local tuning, which may be performed in order to apply local data at each of the first host system 135a and the second host system 135b. For example, the local tuning may include application of configurations based on local data such as, for example, bank accounts, used material types, supplier information, payment conditions, and/or the like. As used herein, local data may include data pertinent to the first enterprise software application 135a and the second enterprise software application 135b individually but not as a collective whole. The resulting configuration data, which captures the customizations necessary to implement the customized function 115, may be persisted at each of the first host system 135a and the second host system 135, for example, at one or more local databases.

According to some example embodiments, prior to sending the artifacts, the configuration engine 110 may stage the customized function 115 including the first subprocess performed by the first enterprise software application 135a and the second subprocess performed by the second enterprise software application 135b. The staging may be performed in order to ensure that with the customizations applied to each of the first enterprise software application 135a and the second enterprise software application 135b, the first subprocess performed by the first enterprise software application 135a and the second subprocess performed by the second enterprise software application 135b are compatible with one another as well as consistent with the customized function 115.

Figure 3:
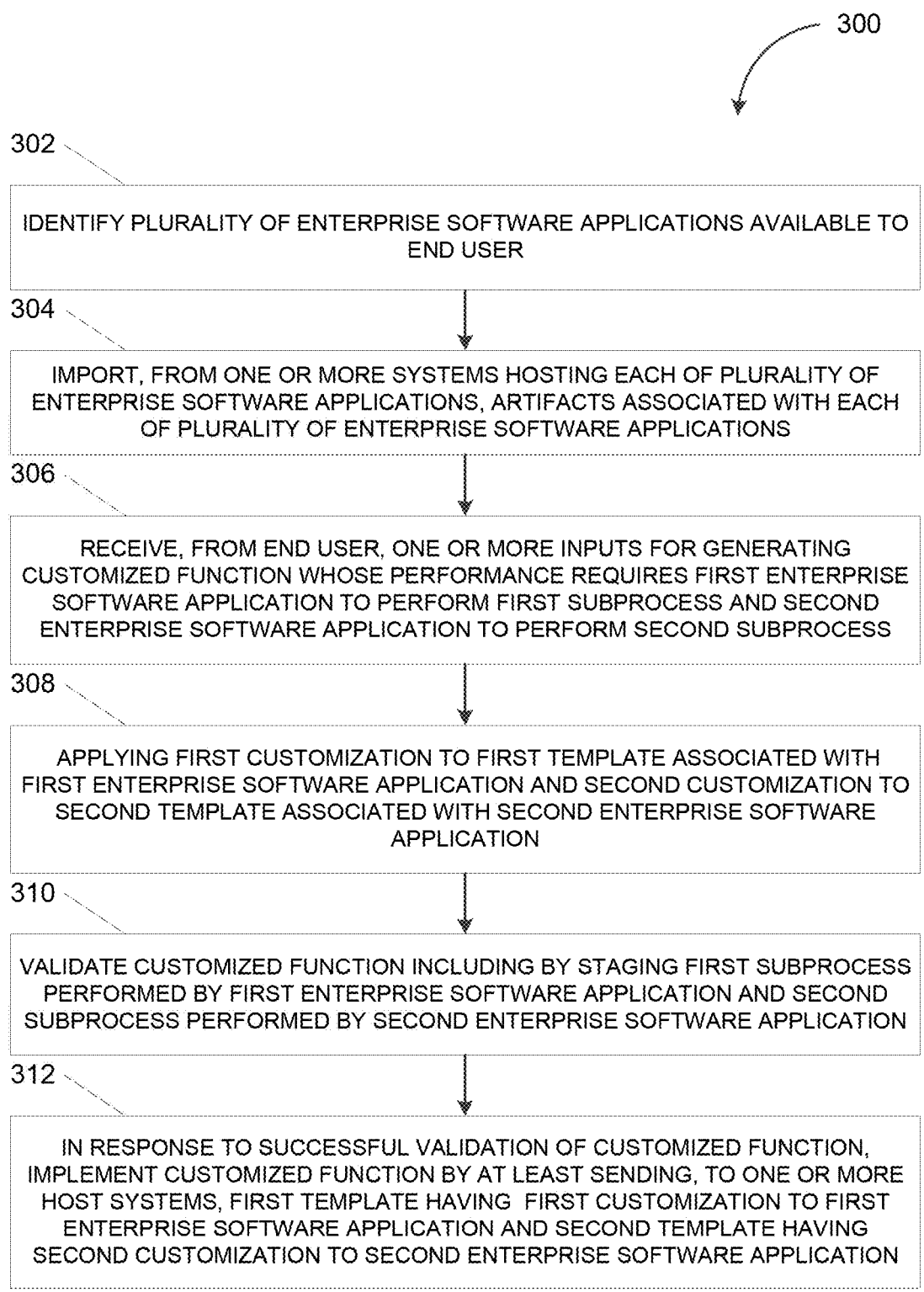
FIG. 3 depicts a flowchart illustrating a process for implementing a customized function, in accordance with some example embodiments.

FIG. 3 depicts a flowchart illustrating a process 300 for implementing a customized function, in accordance with some example embodiments. Referring to FIGS. 1 and 3, the process 300 may be performed by the configuration engine 110 in order to implement one or more customized functions including, for example, the customized function 115. The customized function 115 may include one or more customizations that are specific to the user 125 at the client 120. As noted, examples of the customized function 115 may include billing, invoicing, procurement, payroll, time and attendance management, recruiting and onboarding, learning and development, performance and compensation, and workforce planning. Moreover, performing the customized function 115 may require multiple enterprise software applications including the first enterprise software application 135a and the second enterprise software application 135b.

At 302, the configuration engine 110 may identify a plurality of enterprise software applications available to an end user. For example, the configuration engine 110 may identify the first enterprise software application 135a and the second enterprise software application 135b as being available to the user 125 at the client 120. The first enterprise software application 135a and the second enterprise software application 135b may each be an enterprise resource planning (ERP) software, a customer relationship management (CRM) software, and/or the like.

At 304, the configuration engine 110 may import, from one or more systems hosting each of the plurality of enterprise software applications, artifacts associated with each of the plurality of enterprise software applications. For example, as shown in FIG. 1, the configuration engine 110 may import, from the first host system 135a, one or more artifacts associated with the first enterprise software application 135a. Moreover, the configuration engine 110 may import, from the second host system 135b, one or more artifacts associated with the second enterprise software application 135b. As noted, these artifacts may include documentation as well as metadata identifying one or more static features and/or runtime features of each of the first enterprise software application 135a and the second enterprise software application 135b. In some example embodiments, these artifacts may form the templates associated with each of the first enterprise software application 135a and the second enterprise software application 135b.

At 306, the configuration engine 110 may receive, from the end user, one or more inputs for generating a customized function whose performance requires a first enterprise software application to perform a first subprocess and a second enterprise software application to perform a second subprocess. For example, the user 125 may interact with the configuration engine 110 via the user interface 150. The user interface 150 may be configured to receive, from the user 125, one or more inputs scoping the customized function 115 including, for example, a first input selecting a function and a second input specifying one or more customizations that are applied to the selected function to generate the customized function 115. In some example embodiments, the configuration engine 110 may generate a series of queries for scoping the customized function 115. As such, the first input and/or the second input may be responses to the queries generated by the configuration engine 110 and displayed at the user interface 150.

At 308, the configuration engine 110 may apply, based at least on the one or more inputs, a first customization to a first template associated with the first enterprise software application and a second customization to a second template associated with a second enterprise software application. In some example embodiments, performing the customized function 115 may require the first enterprise software application 135a to perform a first subprocess and the second enterprise software application 135b to perform a second subprocess. Accordingly, the configuration engine 110 may implement the customized function 115 by customizing the first enterprise software application 135a as well as the second enterprise software application 135b.

The first enterprise software application 135a and the second enterprise software application 135b may operate based on different templates reflecting the different manners in which data operated upon by the first enterprise software application 135a and the second enterprise software application 135b is stored. For instance, the first enterprise software application 135a may be associated with a first template defining a first manner in which data is stored in a first database table operated upon by the first enterprise software application 135a while performing the first subprocess. Meanwhile, the second enterprise software application 135b may be associated with a second template defining a second manner in which data is stored in a second database table operated by the second enterprise software application 135b while performing the second subprocess. As such, the configuration engine 110 may implement the customized function 115 by customizing one or more corresponding templates associated with the first enterprise software application 135a and the second enterprise software application 135b.

At 310, the configuration engine 110 may validate the customized function including by staging the first subprocess performed by the first enterprise software application and the second subprocess performed by the second enterprise software application. For example, the configuration engine 110 may stage the customized function 115 including the first subprocess performed by the first enterprise software application 135a and the second subprocess performed by the second enterprise software application 135b. The configuration engine 110 may stage the customized function 115 in order to ensure that with the customizations applied to each of the first enterprise software application 135a and the second enterprise software application 135b, the first subprocess performed by the first enterprise software application 135a and the second subprocess performed by the second enterprise software application 135b are compatible with one another as well as consistent with the customized function 115.

At 312, the configuration engine 110 may respond to a successful validation of the customized function by implementing the customized function including by sending, to the one or more host systems, the first template having the first customization to the first enterprise software application and the second template having the second customization to the second enterprise software application. For example, upon verifying the compatibility and consistency of the customizations applied to each of the first enterprise software application 135a and the second enterprise software application 135b, the configuration engine 110 may send, to each of the first host system 135a and the second host system 135b, artifacts including the customized templates associated with each of the first enterprise software application 135a and the second enterprise software application 135b. The artifacts sent to each of the first host system 135a and the second host system 135b may be subject to local tuning in order to apply local data at each of the first host system 135a and the second host system 135b. Moreover, as noted, configuration data capturing the customizations necessary to implement the customized function 115 may be persisted at each of the first host system 135a and the second host system 135, for example, at one or more local databases.

Figure 4:
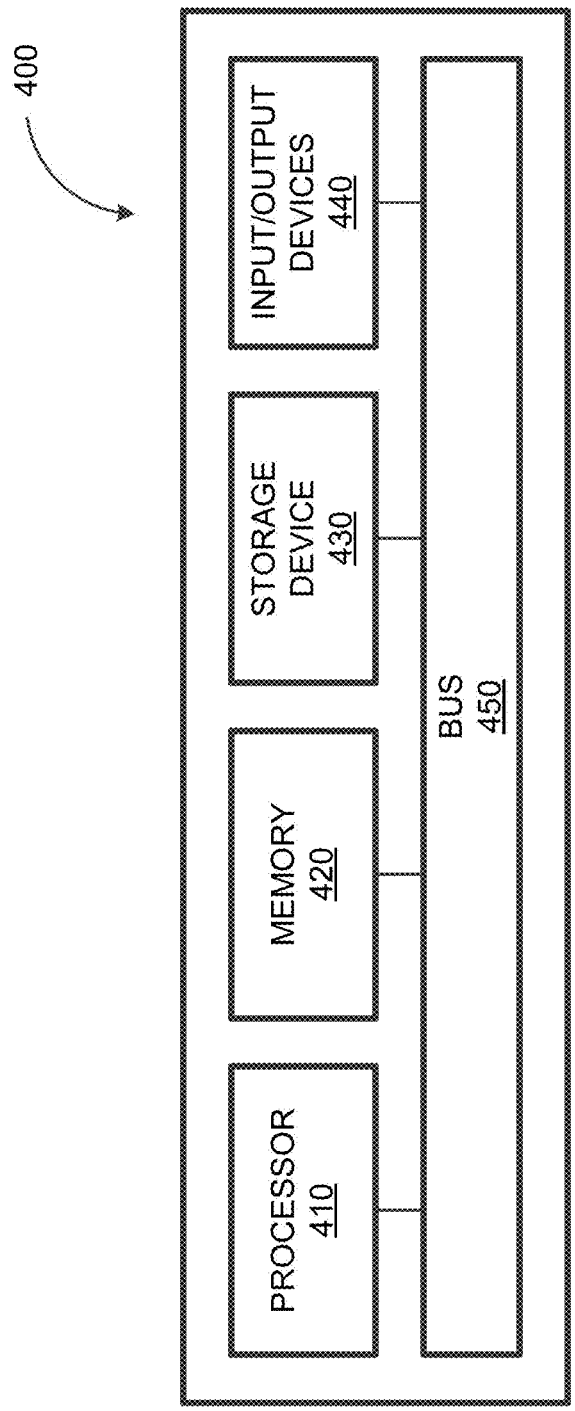
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the configuration engine 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the configuration engine 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   receiving, at a configuration engine, one or more inputs for generating a customized function whose performance requires a first software application to perform a first subprocess and a second software application to perform a second subprocess, the first software application being deployed at a first host system and operating on a first database table having a first column, and the second software application being deployed at a second host system and operating on a second database table having a second column mapped to the first column in order to accomplish the customized function;
   applying, based at least on the one or more inputs, a first customization to a first template associated with the first software application to change a first manner in which data is stored in the first database table operated upon by the first software application performing the first subprocess;
   applying, based at least on the one or more inputs, a second customization to a second template associated with the second software application to change a second manner in which data is stored in the second database table operated upon by the second software application performing the second subprocess;
   staging, at the configuration engine, the customized function to at least determine a compatibility between the first customization applied to the first software application and the second customization applied to the second software application; and
   upon determining that the first customization applied to the first software application is compatible with the second customization applied to the second software application, implementing the customized function by at least sending, to the first host system of the first software application, the first template having the first customization and sending, to the second host system of the second software application, the second template having the second customization.

2. The system of claim 1, wherein the customized function is further staged to at least determine a consistency between the customized function and each of the first customization and the second customization.

3. The system of claim 1, further comprising:
importing, from the first host system, a first artifact including the first template, the first artifact further including documentation and/or metadata, the documentation and/or the metadata identifying one or more static features and/or runtime features of the first software application.

4. The system of claim 1, further comprising:
importing, from the second host system, a second artifact including the second template, the second artifact further including documentation and/or metadata, the documentation and/or the metadata identifying one or more static features and/or runtime features of the second software application.

5. The system of claim 1, further comprising:
generating, by the configuration engine, a user interface for presentation at a client device, the user interface configured to display a plurality of queries, and the user interface further configured to receive, from a user at the client device, the one or more inputs in response to the plurality of queries.

6. The system of claim 1, wherein the first template specifies at least the first column included in the first database table operated upon by the first software application, and wherein the second template specifies at least the second column included in the second database table operated upon by the second software application.

7. The system of claim 1, wherein the first software application and the second software application comprise an enterprise resource planning (ERP) software application, a customer relationship management (CRM) software application, and/or a supply chain management (SCM) software application.

8. The system of claim 1, wherein the one or more functions include invoicing, procurement, payroll, time and attendance management, recruiting and onboarding, learning and development, performance and compensation, and/or workforce planning.

9. A computer-implemented method, comprising:
receiving, at a configuration engine, one or more inputs for generating a customized function whose performance requires a first software application to perform a first subprocess and a second software application to perform a second subprocess, the first software application being deployed at a first host system and operating on a first database table having a first column, and the second software application being deployed at a second host system and operating on a second database table having a second column mapped to the first column in order to accomplish the customized function;
applying, based at least on the one or more inputs, a first customization to a first template associated with the first software application to change a first manner in which data is stored in the first database table operated upon by the first software application performing the first subprocess;
applying, based at least on the one or more inputs, a second customization to a second template associated with the second software application to change a second manner in which data is stored in the second database table operated upon by the second software application performing the second subprocess;
staging, at the configuration engine, the customized function to at least determine a compatibility between the first customization applied to the first software application and the second customization applied to the second software application; and
upon determining that the first customization applied to the first software application is compatible with the second customization applied to the second software application, implementing the customized function by at least sending, to the first host system of the first software application, the first template having the first customization and sending, to the second host system of the second software application, the second template having the second customization.

10. The method of claim 9, wherein the customized function is further staged to at least determine a consistency between the customized function and each of the first customization and the second customization.

11. The method of claim 9, further comprising:
importing, from the first host system, a first artifact including the first template, the first artifact further including documentation and/or metadata, the documentation and/or the metadata identifying one or more static features and/or runtime features of the first software application.

12. The method of claim 9, further comprising:
importing, from the second host system, a second artifact including the second template, the second artifact further including documentation and/or metadata, the documentation and/or the metadata identifying one or more static features and/or runtime features of the second software application.

13. The method of claim 9, further comprising:
generating, by the configuration engine, a user interface for presentation at a client device, the user interface configured to display a plurality of queries, and the user interface further configured to receive, from a user at the client device, the one or more inputs in response to the plurality of queries.

14. The method of claim 9, wherein the first template specifies at least the first column included in the first database table operated upon by the first software application, and wherein the second template specifies at least the second column included in the second database table operated upon by the second software application.

15. The method of claim 9, wherein the first software application and the second software application comprise an enterprise resource planning (ERP) software application, a customer relationship management (CRM) software application, and/or a supply chain management (SCM) software application.

16. A non-transitory computer readable medium storing instructions, which when executed by at least one data processor, result in operations comprising:
receiving, at a configuration engine, one or more inputs for generating a customized function whose performance requires a first software application to perform a first subprocess and a second software application to perform a second subprocess, the first software application being deployed at a first host system and operating on a first database table having a first column, and the second software application being deployed at a second host system and operating on a second database table having a second column mapped to the first column in order to accomplish the customized function;

applying, based at least on the one or more inputs, a first customization to a first template associated with the first software application to change a first manner in which data is stored in the first database table operated upon by the first software application performing the first subprocess;

applying, based at least on the one or more inputs, a second customization to a second template associated with the second software application to change a second manner in which data is stored in the second database table operated upon by the second software application performing the second subprocess;

staging, at the configuration engine, the customized function to at least determine a compatibility between the first customization applied to the first software application and the second customization applied to the second software application; and upon determining that the first customization applied to the first software application is compatible with the second customization applied to the second software application, implementing the customized function by at least sending, to a first host system of the first software application, the first template having the first customization and sending, to a second host system of the second software application, the second template having the second customization.

* * * * *